United States Patent
Transier

(10) Patent No.: US 12,353,431 B2
(45) Date of Patent: Jul. 8, 2025

(54) INDEX COMPRESSION USING REORDERING AND SELF-UPDATES

(71) Applicant: SAP SE, Walldorf (DE)

(72) Inventor: Frederik Transier, Bammental (DE)

(73) Assignee: SAP SE, Walldorf (DE)

( * ) Notice: Subject to any disclaimer, the term of this patent is extended or adjusted under 35 U.S.C. 154(b) by 533 days.

(21) Appl. No.: 16/373,103

(22) Filed: Apr. 2, 2019

(65) Prior Publication Data

US 2020/0320089 A1   Oct. 8, 2020

(51) Int. Cl.
  *G06F 16/25* (2019.01)
  *G06F 16/215* (2019.01)
  *G06F 16/23* (2019.01)

(52) U.S. Cl.
  CPC ......... *G06F 16/258* (2019.01); *G06F 16/215* (2019.01); *G06F 16/2379* (2019.01)

(58) Field of Classification Search
  CPC ... G06F 16/215; G06F 16/2272; G06F 16/328
  See application file for complete search history.

(56) References Cited

U.S. PATENT DOCUMENTS

| | | |
|---|---|---|
| 8,370,316 B2 | 2/2013 | Bensberg et al. |
| 8,527,518 B2 | 9/2013 | Transier et al. |
| 8,805,808 B2 | 8/2014 | Transier et al. |
| 9,009,155 B2 | 4/2015 | Bohnsak et al. |
| 2004/0148301 A1* | 7/2004 | McKay ............... G06F 16/972 |
| 2004/0148303 A1* | 7/2004 | McKay ............... G06F 16/23 |
| 2009/0089256 A1 | 4/2009 | Transier et al. |

FOREIGN PATENT DOCUMENTS

WO   WO2001/057680   *   5/2011   ............ G06F 17/30

OTHER PUBLICATIONS

Färber et al., "The SAP HANA Database—An Architecture Overview," IEEE Data Engineering Bulletin, vol. 35, No. 1, Mar. 2012, 6 pages.
Transier et al., "Engineering Basic Algorithms of an In-Memory Text Search Engine," ACM Transactions on Information Systems (TOIS), vol. 29, No. 1, Dec. 2010, 37 pages.

* cited by examiner

*Primary Examiner* — Amanda L Willis
(74) *Attorney, Agent, or Firm* — Fish & Richardson P.C.

(57) ABSTRACT

The present disclosure involves systems, software, and computer implemented methods for compression operation combining duplicate index entries independent of a data model. One example method includes operations to identify an update to at least one entry in a compressed index that includes a plurality of entries, each associated with a unique entry ID. An entry ID of each entry associated with the update are identified. A self-update is performed for each entry not associated with the entry IDs associated with the update, which comprises inserting a value associated with those non-updated entries to an uncompressed index in connection with that entry's corresponding entry ID. For each entry associated with the update, a particular update value from the identified update is inserted into the uncompressed index associated with the particular entry ID. When completed, the uncompressed index is compressed into a new version of the compressed index.

16 Claims, 5 Drawing Sheets

INDEX COMPRESSION USING REORDERING AND SELF-UPDATES

TECHNICAL FIELD

The present disclosure relates to computer-implemented methods, software, and systems for an in-memory database compression scheme for combining duplicate index entries that works independent of a data model, integrates incremental updates, and achieves high compression.

BACKGROUND

Inverted indexes are state-of-the-art for supporting efficient text search over a collection of documents in databases or search engines. An inverted index holds a set of words each associated with an inverted list pointing to all its occurrences within the document collection. In some instances, documents and words are mapped to integer IDs which are then used within the data structure. To implement fast updates and deletions on these data structures, modern text search engines store so-called term sets for each document listing all IDs of the document's words.

SUMMARY

The present disclosure involves systems, software, and computer-implemented compression methods for combining duplicate index entries independent of a data model. One example method includes identifying an update to at least one entry in a compressed index, wherein the compressed index includes a plurality of entries, and each entry in the compressed index associated with a unique entry ID. An entry ID of each of the entries associated with the identified update is identified in the compressed index. For each of the entries not associated with the identified entry IDs associated with the identified update, a self-update is performed, where performing the self-update comprises inserting a value associated with those entries to an uncompressed index in connection with that entry's corresponding entry ID. For each of the entries associated with the identified entry IDs associated with the update, a particular update value from the update is inserted into the uncompressed index in association with the corresponding entry ID. Upon completion, the uncompressed index is compressed into a new version of the compressed index.

Implementations can optionally include one or more of the following features. In some instances, performing the self-update of entries not associated with the identified entry IDs associated with the identified update and inserting the particular update values from the identified update into the uncompressed index comprises determining a first update associated with a relatively lowest entry ID in the compressed index, the first update corresponding to an updated value. For each entry ID prior to the relatively lowest entry ID associated with the determined first update, a self-update is performed of those entries into the uncompressed index, wherein each entry ID updated into the uncompressed index is associated with the value corresponding to the entry ID in the compressed index. The first update corresponding to the updated value in the uncompressed index is applied in connection with the entry ID of the relatively lowest entry ID.

In some of those instances, after applying the first update, a determination is made as to whether additional updates remain for the compressed index. In response to determining that at least one additional update remains for the compressed index, the relatively lowest entry ID comprises a first relatively lowest entry ID, the method further comprises determining a second update associated with a next relatively lowest entry ID after the first relatively lowest entry ID in the compressed index, where the second update corresponds to a second updated value. For each entry ID after the relatively lowest entry ID associated with the determined first update and before the next relatively lowest entry ID, a self-update of those entries is performed into the uncompressed index, wherein each entry ID updated into the uncompressed index is associated with the value corresponding to the entry ID in the compressed index. Additionally, the second update corresponding to the second updated value is applied in the uncompressed index in connection with the entry ID of the next relatively lowest entry ID. In response to determining that no additional updates remain for the compressed index, the method further comprises, for each entry ID after the relatively lowest entry ID associated with the determined first update and through the last entry ID in the compressed index, performing a self-update of entries into the uncompressed index, wherein each entry ID updated into the uncompressed index is associated with the value corresponding to the entry ID in the compressed index.

In some instances, the compressed index is stored in an in-memory database, and the uncompressed index is created in the same in-memory database.

In some instances, the compressed index is compressed using a compression scheme method comprising identifying an uncompressed index for compression, building a hash map from the identified uncompressed index, generating a term reordering vector and a mapping to entries from the uncompressed index, and applying reordering to the uncompressed index to remove duplicate entries and obtain a compressed index. In some of those instances, compressing the uncompressed index into the new version of the compressed index comprises building a hash map from the generated uncompressed index, generating a term reordering vector and a mapping to entries from the generated uncompressed index, and applying reordering to the generated uncompressed index to remove duplicate entries and obtain the new version of the compressed index.

Similar operations and processes may be performed in a system comprising at least one processer and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques allowing for a compression scheme to be implemented which eliminates normalization deficiencies in in-memory and other types of databases. The present solution allows compression to occur for an index by combining duplicate index entries. The solution works independently of the underlying data model of the content, and instead acts upon the index data structure itself. The described solution achieves high compression and is based on common operations, such as re-ordering and self-updating, allowing the solution to reduce complexity and errors, as well as ease supportability.

In current systems, data models of business applications do not necessarily include a focus on text search, although it remains and may be an integral part of those applications. This lack of focus can lead to data distributions unfavorable for text searching, and thus, can cause drawbacks at compression time and during query performance. That is, in most cases, data is not normalized with respect to its textual content, and is thus likely to contain duplicate texts and documents, causing the index structure to greatly increase in size while reducing usability and performance.

Figure 1:
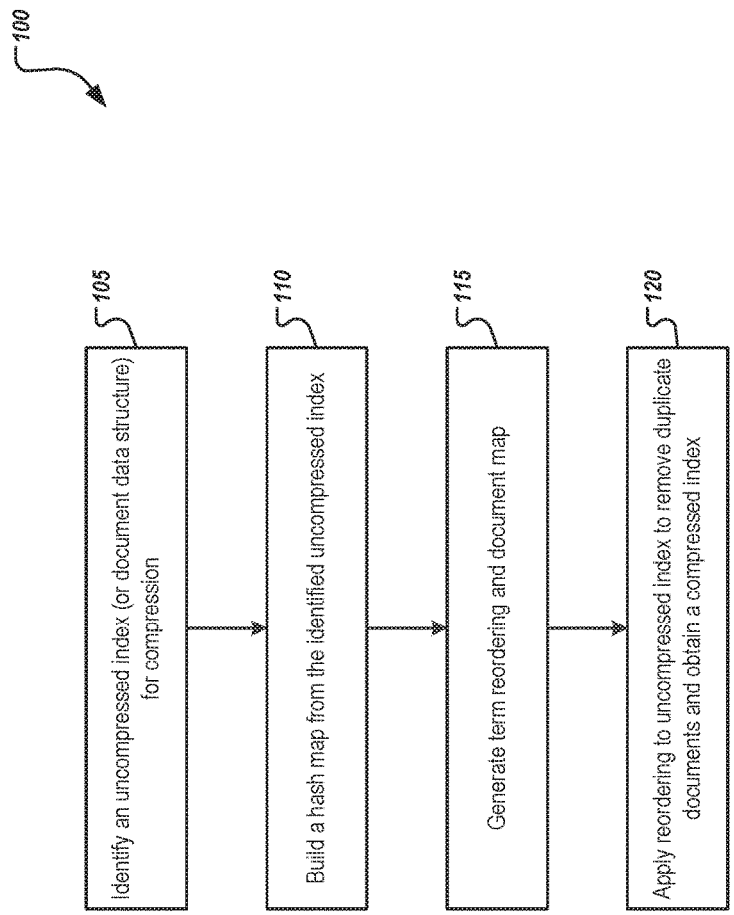
FIG. 1 is an example flowchart illustrating a compression method performed on an index.
Figure 2:
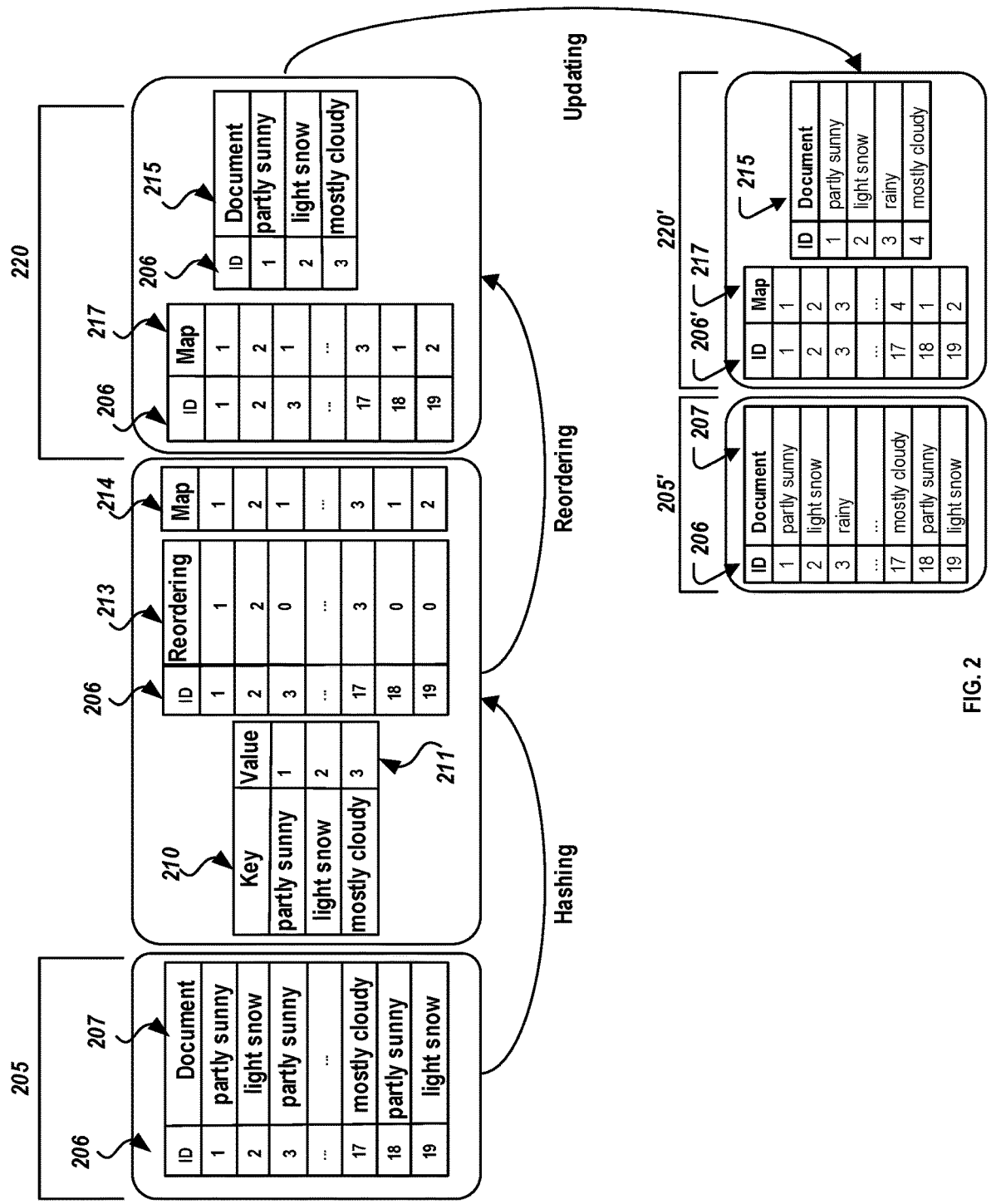
FIG. 2 is an example of compression performed on an example index.

FIG. 1 is an example flowchart illustrating a compression method 100 performed on an index, while FIG. 2 provides an illustration of the method on an existing index.

At 105, an uncompressed index or other document data structure is identified for compression. The uncompressed index may be identified for compression automatically, such as by using a compression service or operation on one or more indices within a database and its various tables. In other instances, particular administrator settings may be applied to certain indices and data structures indicating that those should be compressed.

FIG. 2 provides an example of compression performed on an example index. The example data structure/uncompressed index 205 presented here is a weather-related document, in which the terms included therein include "partly sunny," "light snow," and "mostly cloudy." Other terms may be included, but are not illustrated herein. The illustration is one of a logical representation of an uncompressed index, and may be presented in alternative forms in other examples and implementations. The index may be implemented in or associated with an in-memory database or columnar database, although any suitable format can be used, including a relational database.

As noted, the illustrated data structure 205 is an index identifying the entries or terms 207 in a particular document or file, where that file has been indexed. Each occurrence of a term 207 is associated with a term ID 206, of which there are 19 terms in the index 205.

Returning to FIG. 1, at 110, a dictionary, or hash map, is built from the identified uncompressed index. For the purposes of method 100, the dictionaries are not built from the documents themselves, but instead from the uncompressed indices or other document data structure that has been previously generated or is available.

In the illustrated example, the hash map or dictionary 210 is created based on the unique entries or terms 207 included in the uncompressed index 205. As mentioned above, three entries in the dictionary 210 include "partly sunny," "light snow," and "mostly cloudy." Each of the entries is associated with a particular value used to uniquely identify the particular entry: "party sunny"=1, "light snow"=2, and "mostly cloudy"=3.

Returning to FIG. 1, at 115, the compression method causes a reordering vector and a document map to be generated. The reordering vector is used to identify unique entries within the uncompressed index. The document map can be used to link particular IDs from the original data structure to a particular mapping of the dictionary.

The example of FIG. 2 illustrates the reordering vector 213 and document map 214 as generated by operation 115. As illustrated, for each initial unique instance of a particular entry, a new ID is generated. For example, ID 1 of the uncompressed index 205 includes the first instance of "partly sunny," and thus is provided the first reordering ID of 1. The term ID 2 is associated with an entry of "light snow," also the first entry of that particular entry. Therefore, the term ID 2 is associated with a second reordering ID of 2, as illustrated. The term ID 3 is associated with an entry of "partly sunny," which has already been used. For that reason, term ID 3 is associated with a reordering ID of 0. 0-entries in the reordering vector 213 represent values already used in the data structure/index 205, and such entries can be removed in order to compress the index. A similar process is performed throughout the data structure 205, and a complete reordering process is performed to identify each of the unique entries in the data structure/index 205 as identified within the reordering vector 213.

In parallel, combination, or in sequence, the document map 214 is used to generate mappings from the term IDs from the index 205 to the particular entries in the dictionary 210. Using the values 211 included in the dictionary 210, each term ID is linked to a particular value of the dictionary 210, allowing the index to be compressed, which is represented as a combined compressed index 220. The compressed index 220 is illustrated here as including the term IDs 206' associated with a mapping value 217, which references a compressed dictionary 215.

Returning to FIG. 1 and method 100, at 120 the reordering information is applied to the uncompressed index to remove duplicate documents and obtain the compressed version of the index. The compressed index containing no duplicates can then be used for index queries. The result list from the query can be expanded using the information in the generated map.

For example, a query for "light snow" will return ID 2 of the compressed index (220 of FIG. 2), which corresponds to the entry "light snow." Before the result is returned to the user, the result needs to be expanded to be consistent with the uncompressed version. The result is expanded to all term IDs 206' having a corresponding mapping value 217 of 2. In this example, ID 2 and ID 19 of the data structure 205 and compressed index 220 correspond to "light snow," and would be returned for the query.

It should be noted that any suitable compression process for the uncompressed index or data structure can be performed, so long as duplicates within the uncompressed index are removed in the compressed index, and a mapping can be provided between particular entries in the index to a dictionary of unique entries and values.

At some point after a particular index or data structure has been compressed, updates to that index or data structure may be identified by an associated system. The change in index may be due to changes in the underlying content of a file, table, or other document which is being indexed. In those instances, a corresponding process is performed in order to allow for a self-updating processes such that the compressed index is decompressed, updated in the appropriate locations, and then automatically re-compressed.

In an example based on FIG. 2, a determination may be made that an entry in the compressed index 220 must be updated based on a change in the underlying document or file. For example, an entry with ID=3 has changed from one value to another, such as "partly sunny" to "rainy." Based on the change, and in order to maintain a properly compressed index 220, the compressed index 220 is decompressed, the particular term in the uncompressed index 205' is modified (where 205' represents a version of the uncompressed index 205 with the modification applied), and, once all such updates are made, the updated uncompressed index 205' is recompressed to generate a newly updated compressed index 220'. The recompression process can allow the system to determine if any new unique entries have been added to the uncompressed index, as well as whether and how particular entries should be mapped during the compression process. By using the compression process defined above, or any other suitable compression process, along with the decompression and self-updating, particular indices can be kept updated and similarly compressed without requiring significant human interaction and resources.

Figure 3:
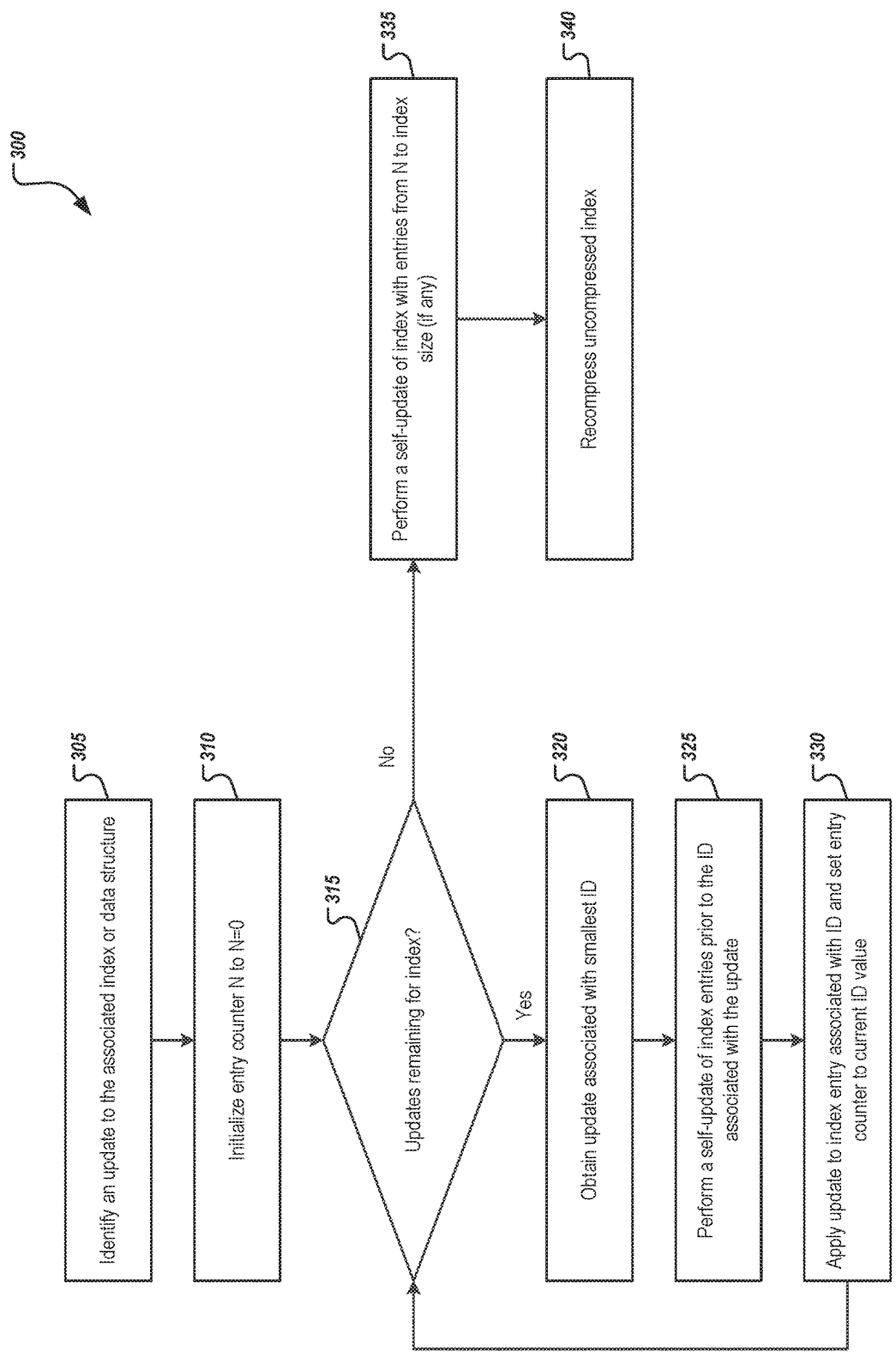
FIG. 3 is an example flowchart illustrating an example method for self-updating an index using decompression and updates to the index in one example implementation.

FIG. 3 is an example flowchart illustrating an example method for self-updating an index using decompression and updates to the index in one example implementation. Specifically, FIG. 3 shows a decompression process with the optional operation of incorporating updates.

At 305, an update to a previously compressed index or other data structure is identified. In some instances, the determination that an update has occurred may be an automatic determination such that the decompression operation is performed immediately, or the decompression may be initiated at a certain time interval to capture and reflect any updates to the index or data structure during that time interval. In other instances, a manual initiation or trigger may cause the decompression and updates to be performed. In instances where the index is stored in an in-memory database, the decompression and update process may be entirely performed within the in-memory database, allowing for a fast and essentially immediate update to the index.

At 310, an entry counter N is initialized to N=0. The variable N can track the current state or progress of the updates to the index.

At 315, a determination is made as to whether any updates remain to be made for the particular index. In the first iteration of method 300, at least one update will remain, as the process was only initiated because at least one update was to be performed. After a first update is performed, the updates may be complete, or one or more updates may need to be performed. If updates remain, method 300 continues at 320, otherwise, method 300 moves to 335 to complete the update process.

At 320, the update associated with the smallest or relatively lowest term ID is obtained or identified. In some instances, the first entry and ID may be associated with the update. In other instances, an entry in the middle or towards the end of the index may be the first updated entry.

At 325, a self-update of the index entries prior to the ID associated with the smallest ID is performed. The self-update of a particular entry comprises storing an uncompressed version of the particular entry in an uncompressed index. For example, if the first update of entries is at ID 3, then the first two entries are pulled from the compressed index and placed in a version of the uncompressed index. Using the values from FIG. 2, then ID 1="partly sunny," and ID 2="light snow." Those two values can be put in entries having term ID 1 and term ID 2 in the uncompressed index. Once the ID is reached where the change, modification, or update is identified, then method 300 continues at 330.

At 330, the update is applied to the index entry associated with the term ID of the update, and the entry counter N is set to the current ID value. Applying the update can include setting the new value of the particular term ID to the updated value in the new, uncompressed version of the index. In doing so, the uncompressed index is modified at the proper location as per the identified update. The entry counter N can be set to the current ID value, and method 300 can return to 315, where a determination is made again of whether additional updates remain. If the updates are complete, then method 300 continues at 335 to complete the decompression process, while if updates remain, method 300 continues back to 320 for further processing and can loop any number of times through the process.

At 335, a self-update is performed for all remaining index entries from the current counter N to the end of the index. In other words, each remaining entry in the compressed index can be retrieved from the compressed index and placed back into the uncompressed index. Once each remaining entry has been added to the uncompressed index, method 300 continues at 340.

At 340, the complete uncompressed index is recompressed using any suitable operations, which may include those operations detailed in FIG. 1. Once the compressed index is completed, method 300 can wait for a new update. When a new update is identified, the process can begin again at 305.

Figure 4:
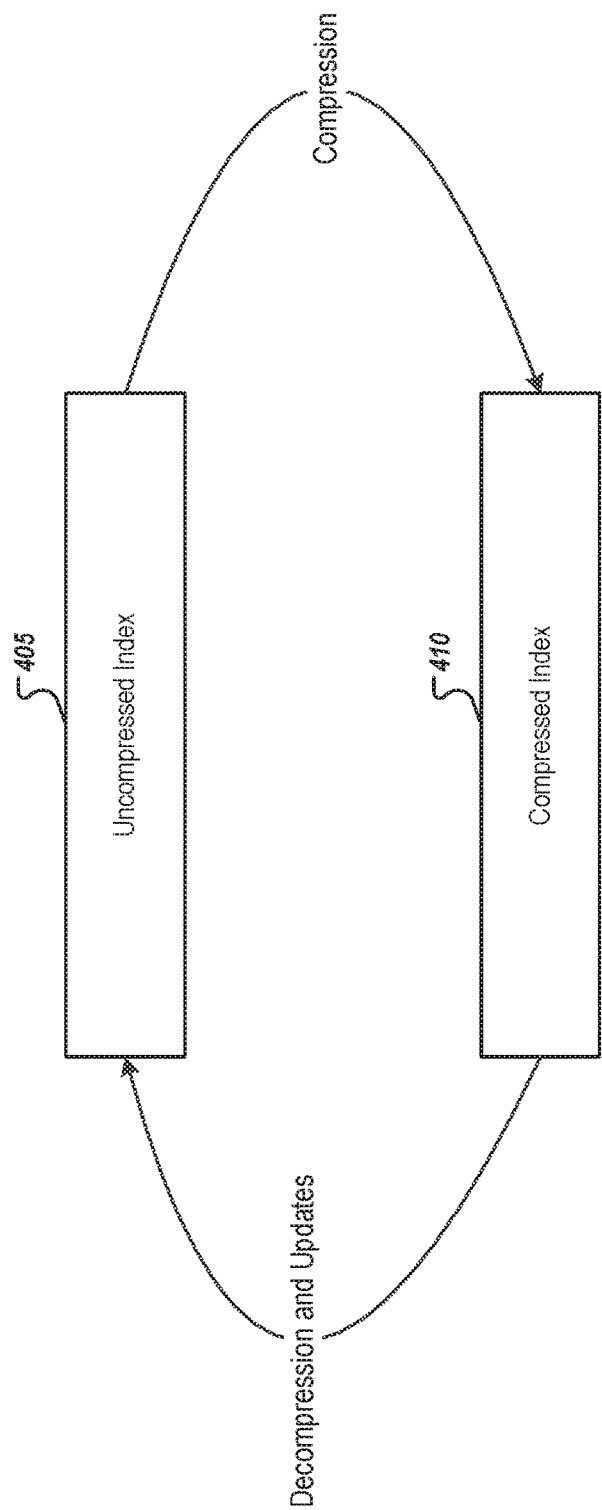
FIG. 4 is an illustration of a compression lifecycle in one example implementation.

FIG. 4 illustrates how data is transferred between compressed 410 and uncompressed 405 states during updates. That is, whenever an update needs to be incorporated into an already compressed index 410, the compressed index is decompressed on-the-fly using the self-updating mechanism described above. Once all updates are incorporated, the uncompressed index 405 is again transformed to its compressed version 410. While illustrated as revolving into the same two indices, each version of the indices will differ based on intervening modifications and updates made during particular cycles. However, to incorporate an update, the compressed index will be decompressed with the updates to a new and updated decompressed index, which will then be compressed using any suitable compression technique back to a compressed index.

Figure 5:
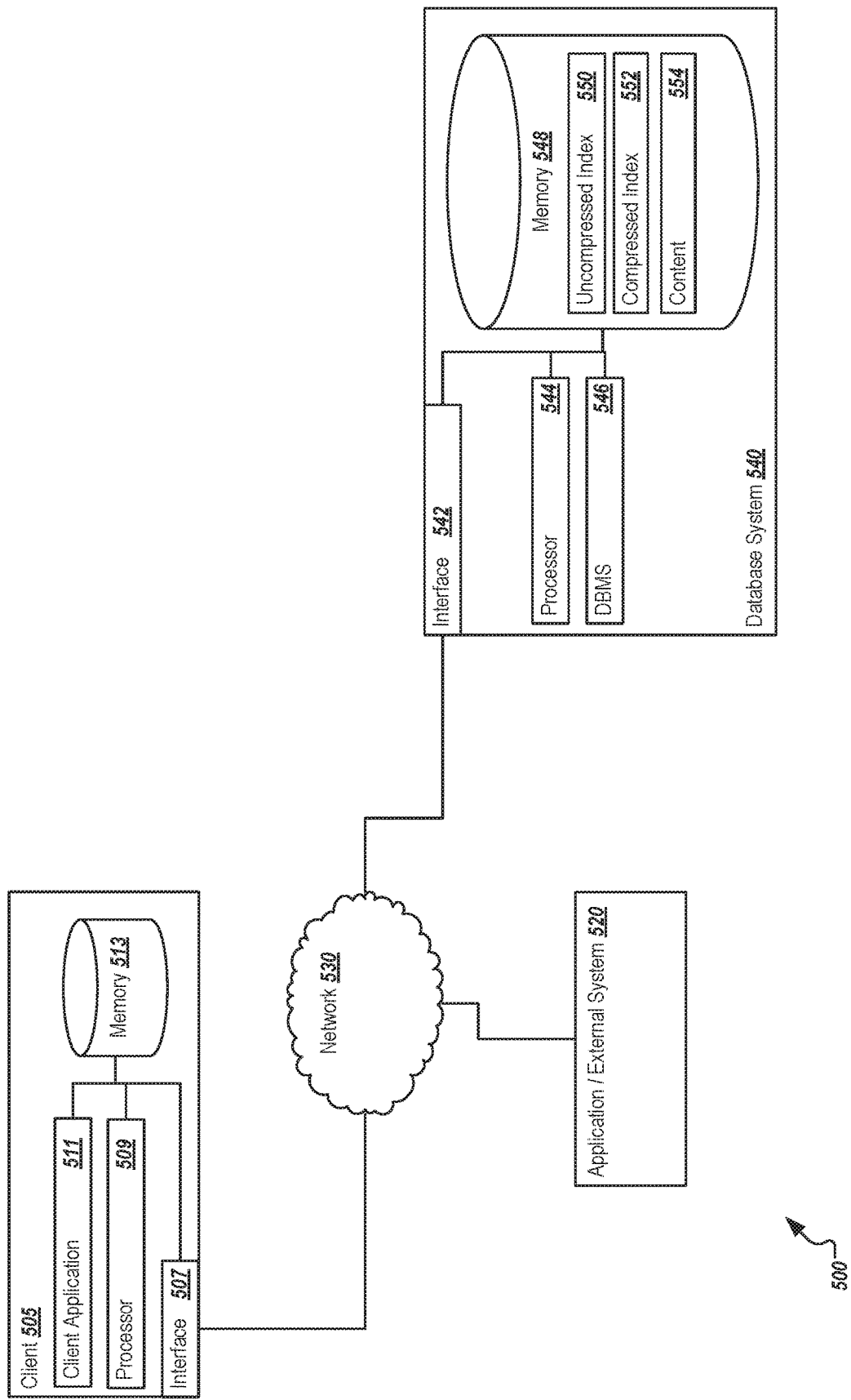
FIG. 5 is a block diagram illustrating an example system for combining duplicate index entries independent of a data model.

FIG. 5 is a block diagram illustrating an example system for combining duplicate index entries independent of a data model. The example system 500 can provide functionalities associated with the described compression and decompression algorithms for updating indices and data structures, according to an example implementation of the present disclosure. In the illustrated implementation, system 500 includes a client 505, one or more external systems or applications 520, and a database system 540, those components connected via a network 530.

System 500 includes functionality and structure associated with receiving information regarding one or more updates to a particular index corresponding to a compressed index 552, which itself is associated with or related to a particular content 554 or document. The compressed index

552 may be a compressed version of an uncompressed index 550, where the uncompressed index 550 represents a complete and non-compressed or only partially compressed index of information and data included in the content 554. The indices 550, 552, and, in some instances, the content 554, can be managed and made accessible by a DBMS 546. The DBMS 546 may, in some cases, provide or otherwise manage a columnar database, where data is stored in columns instead of rows. In some specific implementations, the DBMS 546 can write and read data to and from hard disk storage or a memory-based storage to speed up the time it takes to return a query, and the time it takes to interact with and provide analytics and operations upon data within its databases and tables. One example solution possible for the DBMS 546 may be SAP's HANA. SAP HANA allows users and entities to reduce complexity of their solutions through various means of compression and speed, and can allow solutions to run on the cloud, on premise, or a combination thereof. By running in-memory, data can be processed at a much higher speed than in traditional solid-state device (SSD) drives and hard disk drives. In other instances, however, the DBMS 546 of the database system 540 may be any suitable technology, including row-oriented databases.

System 500 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the term "computer" is intended to encompass any suitable processing device. For example, the database system 540, client 505, and the external system 520 may be any computer or processing device (or combination of devices, or executed on any such devices) such as, for example, a blade server, a general-purpose personal computer (PC), MAC, workstation, UNIX-based workstation, embedded system or any other suitable device. Moreover, although FIG. 5 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. The database system 540 can be any system managing one or more databases, indices, or other content 554. In some instances, the database system 540 may not store or manage the content 554, but instead the indices 550 and 552.

As illustrated, the database system 540 includes an interface 542, at least one processor 544, the DBMS 546, and memory 548. Other components may be included in alternative implementations. Specific to the present solution, the database system 540 can maintain at least one uncompressed index 550 associated with content 554. Using any suitable compression technique, including those described in FIG. 1, the DBMS 546 (or other suitable component) can compress the uncompressed index 550 into a compressed index 552.

In response to information identifying that the underlying index associated with the compressed index 552 is required to change, the DBMS 546 (or other suitable component) can initiate a decompression and update process of the compressed index 552, where unchanged entries in the compressed index 552 are placed into a new version of the uncompressed index, whereas the updates are inserted into the new version of the uncompressed index as appropriate. Once the entire index 550 has been decompressed and updated, the uncompressed index 550 can be recompressed to create an updated version of the compressed index 552. In doing so, a compression scheme that eliminates normalization deficiencies is provided by combining duplicate index entries, where the solution can work independent of the underlying data model, and allow for incremental updates while achieving high compression.

The interface 542 of the database system 540 is used for communicating with other systems in a distributed environment—including within the system 500, connected to the database system 540 and/or network 530, as well as other systems or components communicably coupled to the network 530. Generally, the interface 542 includes logic encoded in software and/or hardware in a suitable combination and operation to communicate with the network 530 and other communicably coupled components. More specifically, the interface 542 may comprise software supporting one or more communication protocols associated with communications such that the database system 540, network 530, and/or interface's hardware is operable to communicate physical signals within and outside of the illustrated system 500. Information regarding one or more changes to a particular index may be received via interface 542, and can be provided to the DBMS 546 to perform the corresponding updates. That information may be received from client 505 (e.g., in response to a change to particular content 554), from an external system or application 520, or internally within the database system 540.

Network 530 facilitates wireless or wireline communications between the components of the system 500 (e.g., between combinations of the database system 540, client(s) 505, external systems 520, and/or other components, among others) as well as with any other local or remote computer, such as additional mobile devices, clients, servers, remotely executed or located portions of a particular component, or other devices communicably coupled to network 530, including those not illustrated in FIG. 5. In this illustrated environment, the network 530 is depicted as a single network, but may be comprised of more than one network without departing from the scope of this disclosure, so long as at least a portion of the network 530 may facilitate communication between senders and recipients. In some instances, one or more of the illustrated components (e.g., the database system 540) or portions thereof may be included within network 530 as one or more cloud-based services or operations. The network 530 may be all or a portion of an enterprise or secured network, while in another instance, at least a portion of the network 530 may represent a connection to the Internet. In some instances, a portion of the network 530 may be a virtual private network (VPN) or an Intranet. Further, all or a portion of the network 530 can comprise either a wireline or a wireless link. Example wireless links may include 802.11a/b/g/n/ac, 802.20, WiMax, LTE, and/or any other appropriate wireless link. In other words, the network 530 encompasses any internal or external network, networks, sub-network, or combination thereof operable to facilitate communications between various computing components inside and outside the illustrated system 500. The network 530 may communicate, for example, Internet Protocol (IP) packets, Frame Relay frames, Asynchronous Transfer Mode (ATM) cells, voice, video, data, and other suitable information between network addresses. The network 530 may also include one or more local area networks (LANs), radio access networks (RANs), metropolitan area networks (MANs), wide area networks (WANs), all or a portion of the internet and/or any other communication system or systems at one or more locations.

As illustrated, the database system 540 also includes the one or more processors 544. Although illustrated as a single processor 544 in FIG. 5, multiple processors may be used according to particular needs, desires, or particular implementations of the system 500. Each processor 544 may be a central processing unit (CPU), an application specific integrated circuit (ASIC), a field-programmable gate array (FPGA), or another suitable component. Generally, the processor 544 executes instructions and manipulates data to perform the operations of the database system 540, in particular, those related to executing the various modules illustrated therein and their related functionality. Specifically, the processor 544 executes the algorithms and operations described in the illustrated figures, as well as the various software modules and functionalities, including the functionality for sending communications to and receiving transmissions from the client 505 and/or the external systems 520, as well as to process and prepare responses to received input associated with an interface 542. Each processor 544 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™ Visual Basic, assembler, Perl®, Swift, HTML5, any suitable version of 4GL, as well as others.

As illustrated, the database system 540 includes memory 548. In some implementations, the database system 540 includes a single memory or multiple memories. The memory 548 may include any type of memory or database module and may take the form of volatile and/or non-volatile memory including, without limitation, magnetic media, optical media, random access memory (RAM), read-only memory (ROM), removable media, or any other suitable local or remote memory component. The memory 548 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database system 540. Additionally, the memory 548 may store any other appropriate data, such as VPN applications, firmware logs and policies, firewall policies, a security or access log, print or other reporting files, as well as others. As illustrated, memory 548 includes, for example, content 554, one or more uncompressed indices 550, and one or more corresponding compressed indices 552, as described herein. Memory 548 may be local to or remote to the database system 540, and may be available remotely via network 530 or an alternative connection in such instances where not locally available. Further, some or all of the data in memory 548 in FIG. 5 may be located outside of the database system 540, including within network 530 as cloud-based storage and data.

Client 505 may be any system which can request data, execute an application (e.g., client application 511), and/or interact with the database system 540 and the interface 542. The client 505, in some instances, may be any other suitable device, including a mobile device, such as a smartphone, a tablet computing device, a smartwatch, a laptop/notebook computer, a connected device, or any other suitable device. Additionally, the client device 505 may be a desktop or workstation, server, or any other suitable device. Similarly, the database system 540 may be a server or a set of servers, a cloud-based application or system, or any other suitable system. In some instances, the client 505 may execute on or be associated with a system executing the database system 540. In general, each illustrated component may be adapted to execute any suitable operating system, including Linux, UNIX, Windows, Mac OS®, Java™ Android™, Windows Phone OS, or iOS™, among others.

Each client 505 may generally be any computing device operable to connect to or communicate within the system 500 via network 530 using a wireline or wireless connection. In general, the client 505 includes an electronic computer device operable to receive, transmit, process, and store any appropriate data associated with the system 500 of FIG. 5. As illustrated, the client 505 can include one or more client applications, including the client application 511. In some instances, the client 505 may include a device that includes one or more input(s), such as a keypad, touch screen, camera, or other device(s) that can interact with the client application 511 and other functionality, and one or more output(s) that convey information associated with the operation of the applications and their application windows to the user of the client 505. The output(s) can include a display, speakers, or any other suitable output component. The information presented by the output(s) can include digital data, visual information, auditory output, or a graphical user interface (GUI) (not shown). In general, client 505 includes an electronic computer device operable to receive transmit, process, and store any appropriate data associated with the system 500 of FIG. 5, including data related to updates associated with one or more of the stored compressed indices 552.

Client application 511 can be any type of application that allows the client 505 to request and view content on the client 505, and to cause one or more indices to be modified at the database system 540. In some instances, client application 540 may correspond with one or more backend applications or functionality executing at or associated with the database system 540, or one or more external systems 520 which may cause a change to occur to a particular index at the database system 540. In some instances, the client application 511 can be associated with functionality for querying an index 552 at the database system 540 via the DBMS 546.

In many instances, the client 505 may be a mobile device, including but not limited to, a smartphone, a tablet computing device, a laptop/notebook computer, a smartwatch, or any other suitable device capable of interacting with the database system 540. One or more additional client applications 511 may be present on the client 505, and can provide varying functionality for users. In some instances, client application 505 may be a web browser, mobile application, cloud-based application, or dedicated remote application or software capable of interacting with at least some of the illustrated systems via network 530 to request and/or modify information associated with one or more of those systems.

As illustrated, the client 505 may also include an interface 507 for communication (similar to or different from interface 542), at least one processor 509 (similar to or different from processor 544), and memory 513 (similar to or different from memory 548). The client 505 may also be associated with a GUI that can interface with at least a portion of the system 500 for any suitable purpose, including generating a visual representation of the client application 511 and/or portions of the content 554, among other suitable presentations of information. The GUI may also be used to view and interact with various Web pages, applications, and Web services located local or external to the client 505, as well as information relevant to the client application 511. Generally, the GUI provides the user with an efficient and user-friendly presentation of data provided by or communicated within the system. The GUI may include a plurality of customizable frames or views having interactive fields, pull-down lists, and buttons operated by the user. For example, the GUI may provide interactive elements that allow a user to view or interact with information related to the operations of processes associated with the database system 540 and any associated systems, among others. In general, the GUI is often configurable, supports a combination of tables and graphs (bar, line, pie, status dials, etc.), and is able to build real-time portals, application windows, and presentations. Therefore, the GUI contemplates any suitable graphical user interface, such as a combination of a generic web browser, a web-enabled application, intelligent engine, and command line interface (CLI) that processes information in the platform and efficiently presents the results to the user visually.

The other external system(s) 520 illustrated in FIG. 5 may be any other data sources or applications associated with or that can cause changes to one or more of the illustrated indices, such as by causing or requiring an update to an index to occur, whether directly or indirectly. The external system(s) 520 can include one or more cloud-based or third-party applications or other functionality that may cause changes to the content 554, and which may then cause modifications to a particular index. Any number of external systems 520 may be used in or related to alternative implementations.

While portions of the elements illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The preceding figures and accompanying description illustrate example processes and computer-implementable techniques. But system 500 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying an update to at least one index entry in a compressed index, wherein the compressed index comprises a plurality of index entries and a compressed dictionary, wherein each index entry in the compressed index identifies (i) a term identifier (ID) of a term of a document from a plurality of documents being indexed and (ii) a unique dictionary entry identification (ID) of the respective term in the compressed dictionary, wherein each mapping value of each index entry in the compressed index maps a respective term ID to a corresponding unique dictionary entry ID identified in the compressed dictionary, and wherein the compressed dictionary is built from a plurality of uncompressed indices that are modifiable through updates, wherein the uncompressed indices identify term IDs of terms identified in index entries in the compressed index;
for each of the at least one index entry in the compressed index that is associated with the update, identifying a first term ID occurring within an order of term IDs as part of the compressed index, wherein the first term ID is a term ID from at least one term ID associated with the at least one index entry associated with the update;
identifying a subset of index entries in the plurality of index entries of the compressed index before a counter of the first term ID;
decompressing the compressed index as the plurality of uncompressed indices;
for each index entry of the subset of index entries, performing a self-update of a respective uncompressed entry in an uncompressed index of the plurality of uncompressed indices that was decompressed from the compressed index by inserting a term associated with a respective mapping value of an index entry in the compressed index, wherein the mapping value comprises an uncompressed version of the respective term in the plurality of uncompressed indices;
for each update associated with an index entry associated with a term from the term IDs that associated with the update, inserting a respective update value from the update into a respective index of the plurality of uncompressed indices that was decompressed from the compressed index, where the respective update value is associated with a respective term ID; and
compressing the plurality of uncompressed indices into a new version of the compressed index, by generating a new version of the compressed dictionary in the new version of the compressed index from the plurality of uncompressed indices.

2. The computer-implemented method of claim 1, wherein performing the self-update comprises:
determining a first update associated with the first term ID in the compressed index, the first update corresponding to an updated value;

for each term ID prior to the first term ID associated with the first update, performing a self-update of uncompressed entries into the plurality of uncompressed indices, wherein each term ID updated into the plurality of uncompressed indices is associated with the updated value corresponding to the first term ID in the compressed index; and applying the first update corresponding to the updated value in the plurality of uncompressed indices in connection with the dictionary entry ID of the first term ID.

3. The computer-implemented method of claim 2, wherein after applying the first update, the method further comprises determining whether additional updates remain for the compressed index.

4. The computer-implemented method of claim 3, wherein, in response to determining that at least one additional update remains for the compressed index, the method further comprises:

determining a second update associated with a next lowest term ID after the first term ID in the compressed index, the second update corresponding to a second updated value;

for each term ID after the first term ID associated with the first update and before the next lowest term ID, performing a self-update of uncompressed entries into the plurality of uncompressed indices, wherein each term ID updated into the plurality of uncompressed indices is associated with a value corresponding to the respective term ID in the compressed index; and applying the second update corresponding to the second updated value in the plurality of uncompressed indices in connection with the dictionary entry ID of the next lowest term ID.

5. The computer-implemented method of claim 3, wherein, in response to determining that no additional updates remain for the compressed index, the method further comprises, for each term ID after the first term ID associated with the first update and through a last term ID in the compressed index, performing a self-update of uncompressed entries into the plurality of uncompressed indices, wherein each term ID updated into the plurality of uncompressed indices is associated with a value corresponding to a respective term ID in the compressed index.

6. The computer-implemented method of claim 1, wherein the compressed index is stored in an in-memory database, and wherein the plurality of uncompressed indices is created in the in-memory database.

7. A non-transitory, computer-readable medium storing computer-readable instructions executable by a computer and configured to perform operations comprising:

identifying an update to at least one index entry in a compressed index, wherein the compressed index comprises a plurality of index entries and a compressed dictionary, wherein each index entry in the compressed index identifies (i) a term identifier (ID) of a term of a document from a plurality of documents being indexed and (ii) a unique dictionary entry identification (ID) of the respective term in the compressed dictionary, wherein each mapping value of each index entry in the compressed index maps a respective term ID to a corresponding unique dictionary entry ID identified in the compressed dictionary, and wherein the compressed dictionary is built from a plurality of uncompressed indices that are modifiable through updates, wherein the uncompressed indices identify term IDs of terms identified in index entries in the compressed index;

for each of the at least one index entry in the compressed index that is associated with the update, identifying a first term ID occurring within an order of term IDs as part of the compressed index, wherein the first term ID is a term ID from at least one term ID associated with the at least one index entry associated with the update;

identifying a subset of index entries in the plurality of index entries of the compressed index before a counter of the first term ID;

decompressing the compressed index as the plurality of uncompressed indices;

for each index entry of the subset of index entries, performing a self-update of a respective uncompressed entry in an uncompressed index of the plurality of uncompressed indices that was decompressed from the compressed index by inserting a term associated with a respective mapping value of an index entry in the compressed index, wherein the mapping value comprises an uncompressed version of the respective term in the plurality of uncompressed indices;

for each update associated with an index entry associated with a term from the term IDs that associated with the update, inserting a respective update value from the update into a respective index of the plurality of uncompressed indices that was decompressed from the compressed index, where the respective update value is associated with a respective term ID; and compressing the plurality of uncompressed indices into a new version of the compressed index, by generating a new version of the compressed dictionary in the new version of the compressed index from the plurality of uncompressed indices.

8. The non-transitory, computer-readable medium of claim 7, wherein performing the self-update comprises:

determining a first update associated with the first term ID in the compressed index, the first update corresponding to an updated value;

for each term ID prior to the first term ID associated with the first update, performing a self-update of uncompressed entries into the plurality of uncompressed indices, wherein each term ID updated into the plurality of uncompressed indices is associated with the updated value corresponding to the first term ID in the compressed index; and applying the first update corresponding to the updated value in the plurality of uncompressed indices in connection with the dictionary entry ID of the first term ID.

9. The non-transitory, computer-readable medium of claim 8, wherein the operations further comprise:

after applying the first update, determining whether additional updates remain for the compressed index.

10. The non-transitory, computer-readable medium of claim 9, wherein the operations further comprise:

in response to determining that at least one additional update remains for the compressed index, determining a second update associated with a next lowest term ID after the first term ID in the compressed index, the second update corresponding to a second updated value;

for each term ID after the first term ID associated with the first update and before the next lowest term ID, performing a self-update of uncompressed entries into the plurality of uncompressed indices, wherein each term ID updated into the plurality of uncompressed indices is associated with a value corresponding to the respective term ID in the compressed index; and applying the second update corresponding to the second updated value in the plurality of uncompressed indices in connection with the dictionary entry ID of the next lowest term ID.

11. The non-transitory, computer-readable medium of claim 9, wherein the operations further comprise:
in response to determining that no additional updates remain for the compressed index, for each term ID after a lowest term ID associated with the first update and through a last term ID in the compressed index, performing a self-update of uncompressed entries into the plurality of uncompressed indices, wherein each term ID updated into the plurality of uncompressed indices is associated with a value corresponding to a respective term ID in the compressed index.

12. The non-transitory, computer-readable medium of claim 7, wherein the compressed index is stored in an in-memory database, and wherein the plurality of uncompressed indices is created in the in-memory database.

13. A system comprising:
at least one memory to store executable instructions; and
at least one processor communicatively coupled to the at least one memory, the at least one processor configured to execute the executable instructions to perform operations comprising:
identifying an update to at least one index entry in a compressed index, wherein the compressed index comprises a plurality of index entries and a compressed dictionary, wherein each index entry in the compressed index identifies (i) a term identifier (ID) of a term of a document from a plurality of documents being indexed and (ii) a unique dictionary entry identification (ID) of the respective term in the compressed dictionary, wherein each mapping value of each index entry in the compressed index maps a respective term ID to a corresponding unique dictionary entry ID identified in the compressed dictionary, and wherein the compressed dictionary is built from a plurality of uncompressed indices that are modifiable through updates, wherein the uncompressed indices identify term IDs of terms identified in index entries in the compressed index;
for each of the at least one index entry in the compressed index that is associated with the update, identifying a first term ID occurring within an order of term IDs as part of the compressed index, wherein the first term ID is a term ID from at least one term ID associated with the at least one index entry associated with the update;
identifying a subset of index entries in the plurality of index entries of the compressed index before a counter of the first term ID;
decompressing the compressed index as the plurality of uncompressed indices;
for each index entry of the subset of index entries, performing a self-update of a respective uncompressed entry in an uncompressed index of the plurality of uncompressed indices that was decompressed from the compressed index by inserting a term associated with a respective mapping value of an index entry in the compressed index, wherein the mapping value comprises an uncompressed version of the respective term in the plurality of uncompressed indices;
for each update associated with an index entry associated with a term from the term IDs that associated with the update, inserting a respective update value from the update into a respective index of the plurality of uncompressed indices that was decompressed from the compressed index, where the respective update value is associated with a respective term ID; and
compressing the plurality of uncompressed indices into a new version of the compressed index, by generating a new version of the compressed dictionary in the new version of the compressed index from the plurality of uncompressed indices.

14. The system of claim 13, wherein performing the self-update comprises:
determining a first update associated with the first term ID in the compressed index, the first update corresponding to an updated value;
for each term ID prior to the first term ID associated with the first update, performing a self-update of uncompressed entries into the plurality of uncompressed indices, wherein each term ID updated into the plurality of uncompressed indices is associated with the updated value corresponding to the first term ID in the compressed index; and
applying the first update corresponding to the updated value in the plurality of uncompressed indices in connection with the dictionary entry ID of the first term ID.

15. The system of claim 14, wherein the operations further comprise:
after applying the first update, the determining whether additional updates remain for the compressed index.

16. The system of claim 15, wherein the operations further comprise:
in response to determining that at least one additional update remains for the compressed index, determining a second update associated with a next lowest term ID after the first term ID in the compressed index, the second update corresponding to a second updated value;
for each term ID after the first term ID associated with the first update and before the next lowest term ID, performing a self-update of uncompressed entries into the plurality of uncompressed indices, wherein each term ID updated into the plurality of uncompressed indices is associated with a value corresponding to the respective term ID in the compressed index; and
applying the second update corresponding to the second updated value in the plurality of uncompressed indices in connection with the dictionary entry ID of the next lowest term ID.

* * * * *